United States Patent [19]

Kalpins

[11] 4,328,648

[45] May 11, 1982

[54] SUPPORT SYSTEM

[76] Inventor: Alexandrs K. Kalpins, 144-39 37th Ave., Flushing, N.Y. 11354

[21] Appl. No.: 132,419

[22] Filed: Mar. 21, 1980

[51] Int. Cl.³ .............................................. E02D 27/34
[52] U.S. Cl. ....................................... 52/167; 248/638
[58] Field of Search ...................... 52/167; 248/20, 638

[56] References Cited

U.S. PATENT DOCUMENTS

| | | | |
|---|---|---|---|
| 1,761,321 | 6/1930 | Wells | 52/167 |
| 2,200,561 | 5/1940 | Rosenzweig | 248/20 |
| 3,592,422 | 7/1971 | Paine | 248/20 |
| 3,789,174 | 1/1974 | Barkan | 52/167 |
| 3,794,277 | 2/1974 | Smedley | 52/167 |
| 3,998,062 | 12/1976 | Lange | 52/167 |

Primary Examiner—James A. Leppink
Assistant Examiner—Henry E. Raduazo

[57] ABSTRACT

This invention relates to means for protecting nuclear reactors and other structures from earthquakes, explosions, cyclones and other sources of sudden external shock, said means including a support system comprised of a base, a pedestal, hanger-rods and an elastomer element.

2 Claims, 25 Drawing Figures

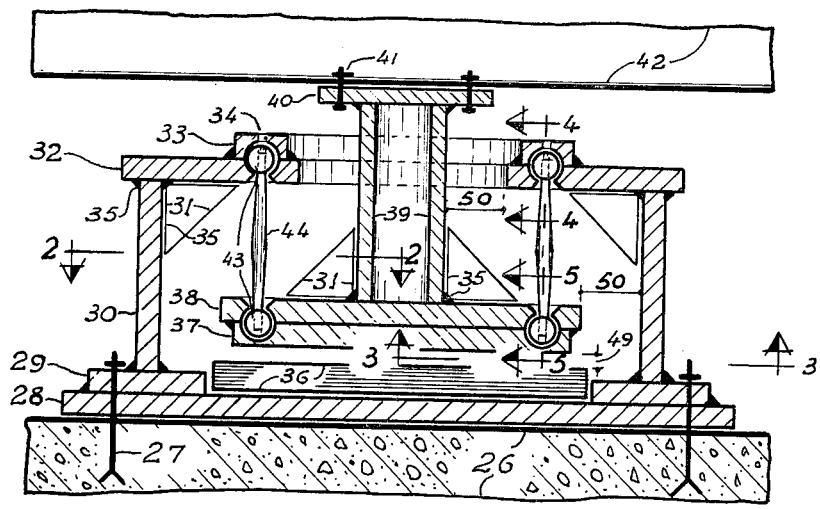
FIG. 1.
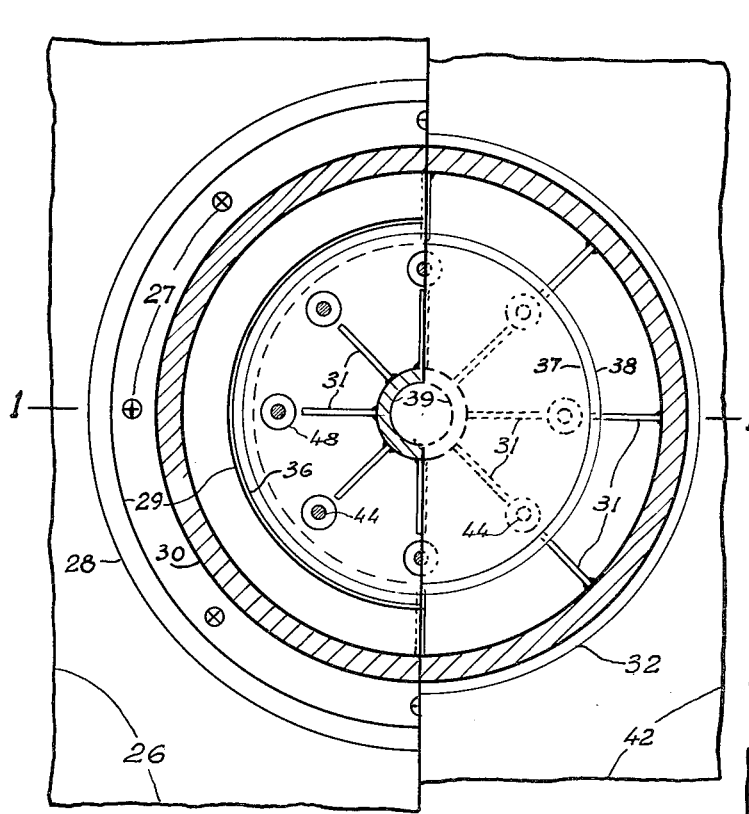
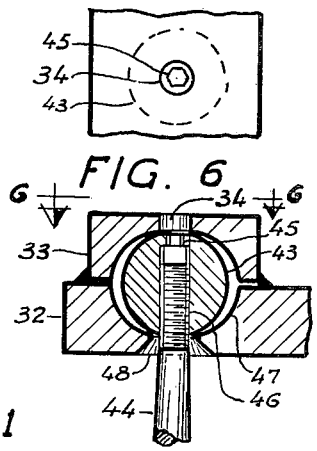
FIG. 4.
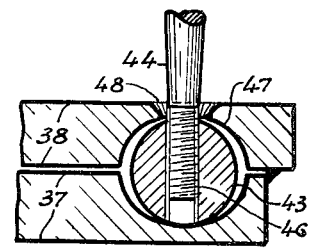
FIG. 2.   FIG. 3.   FIG. 5.

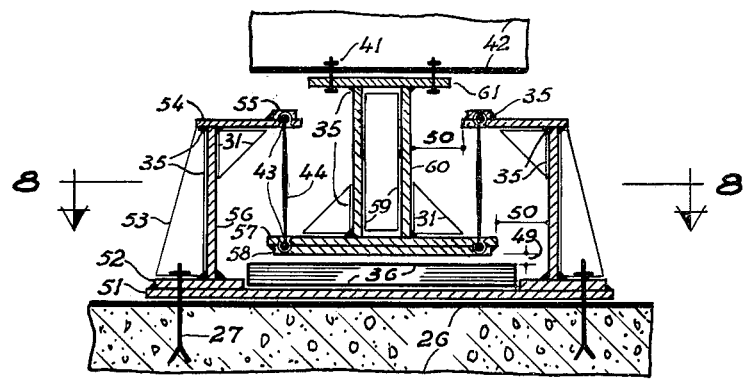
FIG. 7.
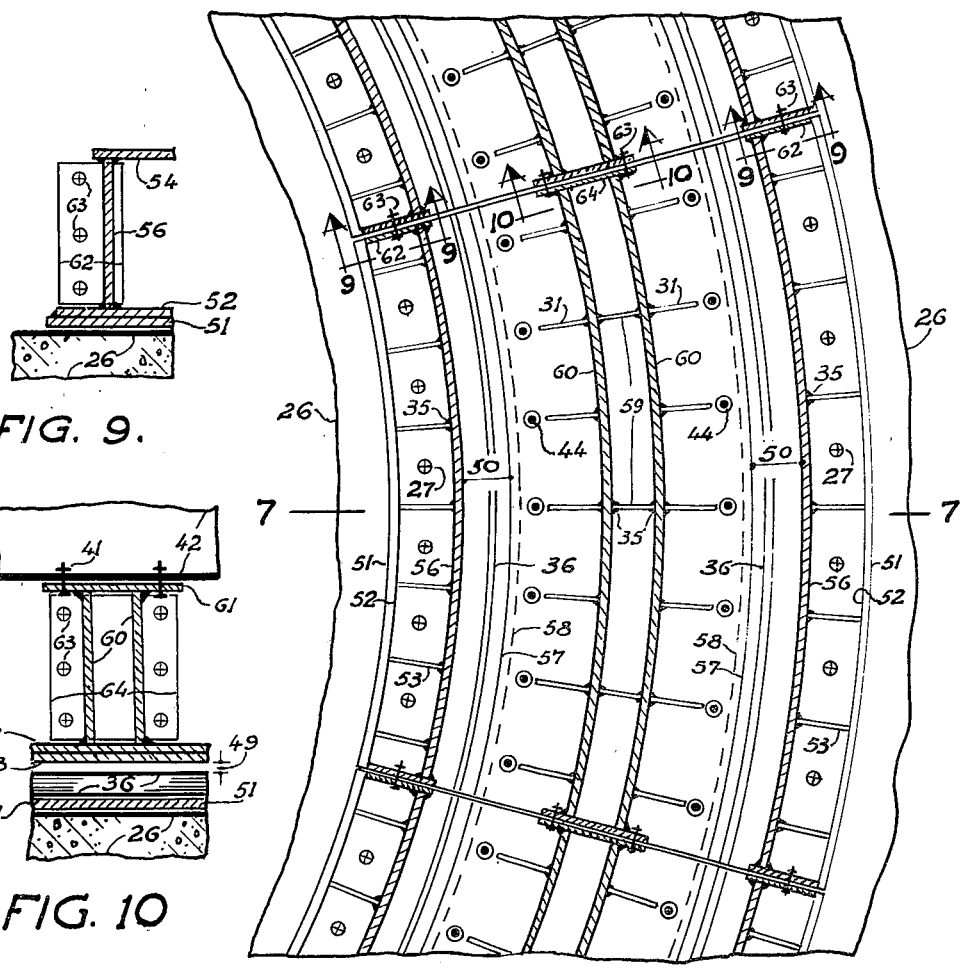
FIG. 9.
FIG. 10
FIG. 8.

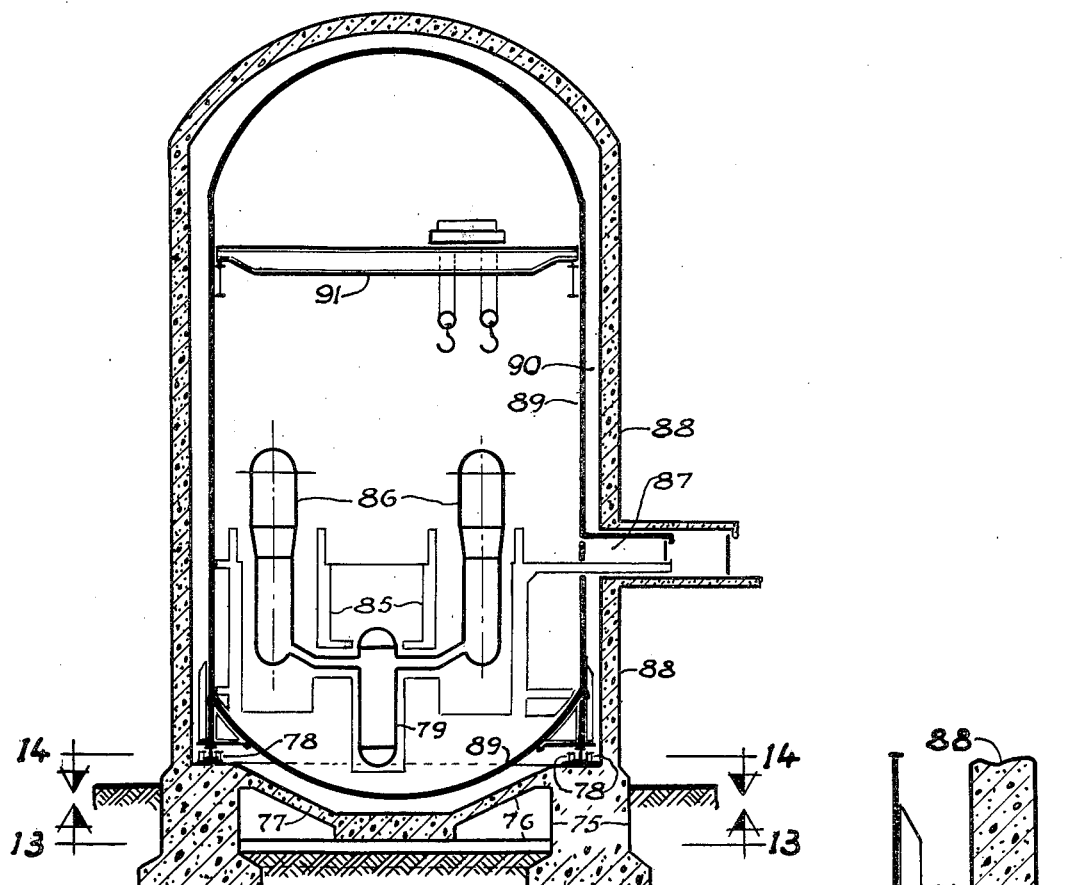
FIG. 12.
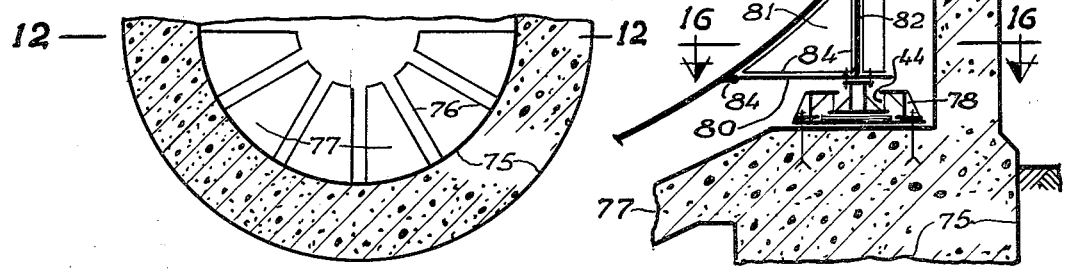
FIG. 13.
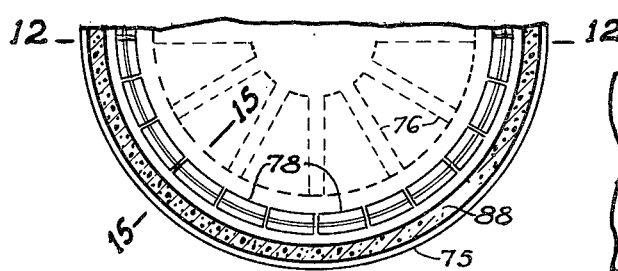
FIG. 14.
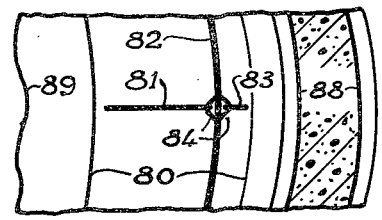
FIG. 15.
FIG. 16.

SUPPORT SYSTEM

The present invention relates to a support system bearing, for instance, a protection of any structure from dynamic air pressure such as explosion, cyclones, dynamic reversing horizontal earthquake motion and the like.

BACKGROUND

The dynamic air force is directly proportional to the dynamic impact of the air, and to the surfce area of the structural body multiplied by a shape factor of the structure. If the construction is built solidly all objects within it are protected from the dynamic air forces.

The different conventional bearings usually are used for bridge constructions to transfer the loads from the superstructure to the abutment-foundation. The conventional ball, cylinder bearings, etc. mostly transfer only compression force from the superstructure to the abutment but do not join the superstructure and abutment for the tension force. During World War II there were many bridge damages from the near heavy bomb explosions. The dynamic components of the air pressure lifted the superstructure off the abutment and placed it on the side of the abutments. Mostly the superstructure and the abutments had only small damages.

An object of this invention is to provide a hanging connection between the supported and supporting structural bodies but join the supported and supporting bodies for the compression and tension force respectively for positive and negative reactions. In the case of dynamic air pressure the structural body moves elastically in horizontal and relatively small vertical directions without swinging by sloping the Hangers-rods. The action of sloped Hangers-rods is similar to the elastic action of the springs. Increasing a slope of the Hangers-rods increases this horizontal counterforce to the air pressure.

Other objects will be appreciated from the following description of the invention.

RAPIDLY REVERSING DYNAMIC EARTHQUAKE FORCE

Earthquakes comprise horizontal and vertical ground vibrations. During an earthquake, structural bodies such as nuclear power plants, chimneys, bridges, electrical towers and the like structures, which are connected to the earth by conventional foundations, are subjected to forced vibrations which are imposed on to these structural bodies by the movement of their respective foundations. The inertia of the structural body tend to resist the earthquake-induced movements of the foundation. As a result, a lateral shearing force-BASE SHEAR-is applied to the structural body of its foundation. The magnitude of this BASE SHEAR is a major factor in earthquake damage and is the principal concern of the structural designer. Inasmuch as the forces to which a structural body is subjected during an earthquake are directly proportional to the mass of the structural body, these forces can be minimized to some extent through the utilization of light-weight materials of construction and by designing structures of relatively low total weight; however, the structural designer is limited in his approach because of the types and cost of current commercially available materials of construction.

In the case of a nuclear power facility, potential earthquake damage constitutes a special safety problem because of the possibility that fission products may be released. Accordingly, a relatively higher safety factor is required to avoid the possibility of exposing the population to excessive radiation.

The usual design approach is to use available materials and to size all structural members so as to withstand an earthquake of predetermined level of severity. It has to be kept in mind, however, that earthquakes do not have a "windward" or "leeward" side. The rapidly reversing earthquake force is inertial force and affects all internal structural components and EQUIPMENT as well as external elements of the structure and acts upon the center of gravity of an element.

The present invention obviates or at least minimizes many of the aforementiond difficulties and provides a support system whereby the stress to which a structural body is subjected during an earthquake can be attenuated. Moreover, the present invention provides a support system which can be constructed at a relatively low cost. Also, the present support system provides a hanging connection between the supported and supporting structural bodies which does not transmit horizontal earthquake vibrations to the supported structural body, but which effectively immobilizes the supported structural body.

SUMMARY OF THE INVENTION

The present invention contemplates a support system in which a structural body is gravitationally hanging in the support system.

The support system generally consists of four parts.

The first part is the base of the support system. The base is rigidly fixed with the supporting part of the structural body as foundation, abutment, beams and the like structures which are connected with the earth and with the earth movement.

The second part of the support system is a pedestal and is hanging by the Hanger-rods onto the first part or base of the support system. The pedestal of the support system is rigidly fixed to the structural body and moves together with the supported structural body.

The third part of the support system are Hanger-rods, which join the second part—pedestal and the supported structural body to the first part-base and supporting part of the structural body. The Hanger-rods are at their upper ends placed in the base and at their lower ends in the pedestal through conventional ball bearings. The Hanger-rods through the conventional ball bearings on both ends have complete freedom of rotation permitting substantially independent relative parallel motion between the base of the support system, the supporting structural body, the pedestal of the support system, and the supported structural body, during external motion due to earthquake, wind, dynamic air pressure and the like. The frictional force generated on the ends of the Hanger-rods by conventional ball bearings is less than the force required to move the supported structural body together with the supporting structural body.

The Hanger-rods cannot move axially, therefore the new support system resists compression and tension force, and respectively joins the supported part of the structural body to the supporting part of structural body for positive and negative vertical reactions.

The fourth part of the support system is an Elastomer, in order to make the support system perfectly safe in case the Hanger-rods give way.

Moreover, the present invention provides a support system which can be constructed and placed at relatively low cost.

The invention may be more readily understood by referring generally to the various figures of the drawings.

BRIEF DESCRIPTION OF THE DRAWINGS

In the drawings.

FIG. 1 is a vertical section view of the support system taken along plane 1—1 in FIGS. 2 and 3.

FIG. 2 is a horizontal cross-sectional view taken along place 2—2 in FIG. 1.

FIG. 3 is a horizontal cross-sectional view taken along plane 3—3 in FIG. 1.

FIG. 4 is an enlarged detailed sectional view of the hanger-rods top-end taken along plane 4—4 in FIG. 1.

FIG. 5 is an enlarged detailed sectional view of the hanger-rods bottom end taken along plane 5—5 in FIG. 1.

FIG. 6 is a plane view of the hanger-rods top plate taken along plane 6—6 in FIG. 4.

FIGS. 7, 8, 9 and 10 illustrate another embodiment of the invention in which the base and pedestal of the new support system are stiff curved steel plates.

FIG. 7 is a vertical section view taken along plane 7—7 in FIG. 8.

FIG. 8 is a horizontal cross-sectional view taken along plane 8—8 in FIG. 7.

FIG. 9 is an enlarged detailed view, partly in section, taken along plane 9—9 in FIG. 8.

FIG. 10 is an enlarged detailed view, partly in section, taken along plane 10—10 in FIG. 8.

FIGS. 12, 13, 14, 15 and 16. EXAMPLE -1
NUCLEAR POWER PLANT

FIG. 12 is a vertical sectional view taken along plane 12—12 in FIGS. 13 and 14.

FIG. 13 is a horizontal cross-sectional view taken along plane 13—13 in FIG. 12.

FIG. 14 is a horizontal cross-sectional view taken along plane 14—14 in FIG. 12.

FIG. 15 is an enlarged detailed-sectional view taken along plane 15—15 in FIG. 14.

FIG. 16 is an enlarged detailed-sectional view taken along plane 16—16 in FIG. 15.

FIG. 17 is a vertical cross-sectional view taken along plane 17—17 in FIG. 18.

FIG. 18 is a horizontal cross-sectional view taken along plane 18—18 in FIG. 17.

FIG. 19 is an enlarged detailed view taken along plane 19—19 in FIGS. 17 and 18.

FIG. 20 is a horizontal sectional view taken along plane 20—20 in FIGS. 21 and 22. FIG. 21 is a side elevational view taken along plane 21—21 in FIG. 20.

FIG. 22 is a vertical cross-sectional view taken along plane 22—22 in FIG. 20.

FIG. 23 is a fragmentary side elevational view taken along plane 23—23 in FIG. 24.

FIG. 24 is a vertical cross-sectional view taken along plane 24—24 in FIG. 23.

FIG. 25 is a fragmentary horizontal sectional view taken along plane 25—25 in FIG. 23.

DETAILED DESCRIPTION OF PREFERRED EMBODIMENT

Figure 11:
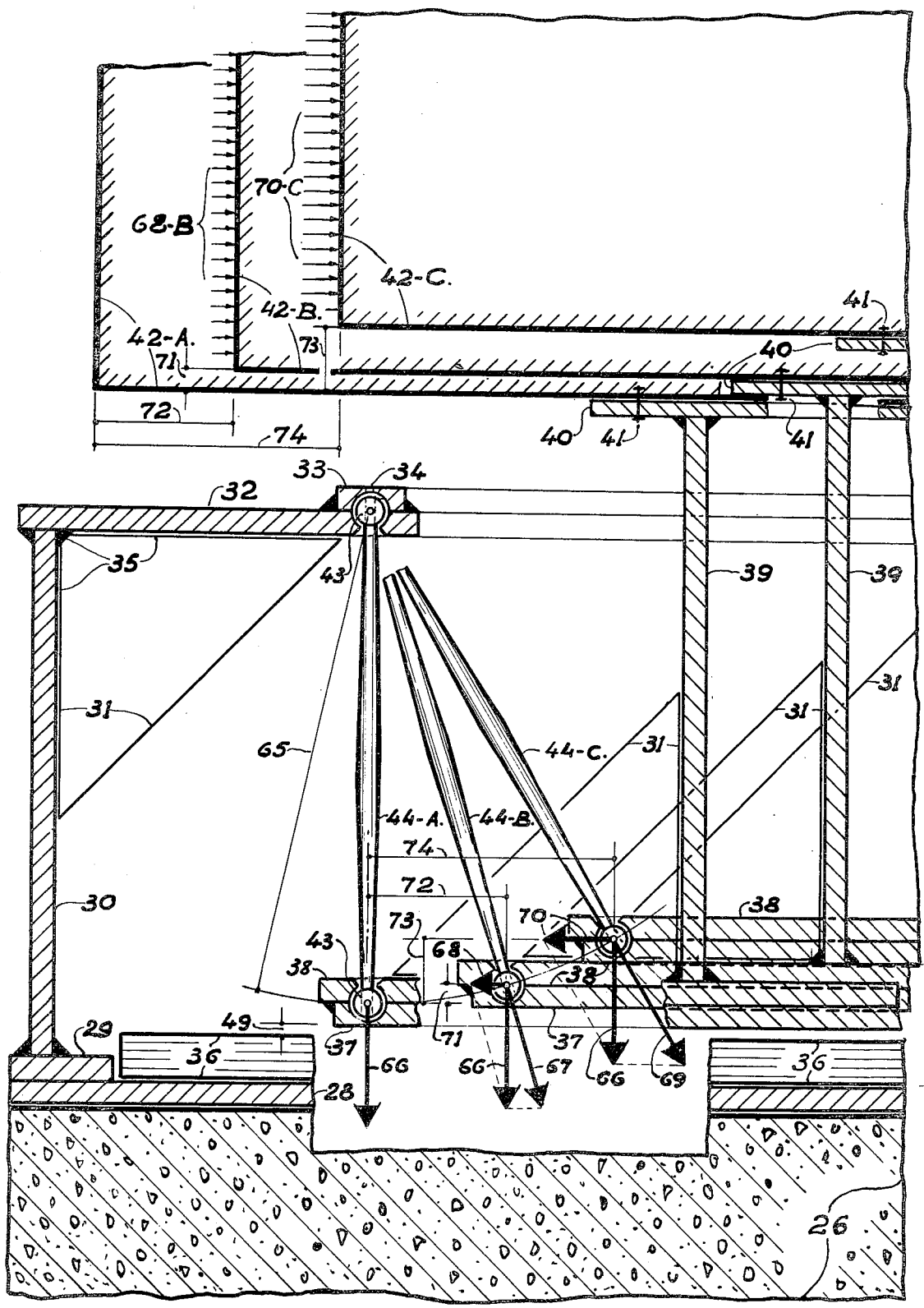
FIG. 11 is an enlarged fragmentary detailed vertical sectional view, taken along plane 1—1 in FIG. 2 and similarly taken along plane 7—7 in FIG. 8.

My invention-support system-belongs to the special group of the Civil Engineer construction elements under the name, support system (bearings). In order to give a better understanding of the invention I would like to explain first the six principal drawings and later in detail.

(1) The first part of the support system is the base. FIGS. 1, 2, 3, 4, 6 Numbers of details 28, 29, 30, 31, 32, 33, 34, 35, 47, 48. This part of the new support system—base is rigidly connected by the anchor bolts 27 to the supporting structure 26 and resists all forces relative to the supported structural body as compression, tension, bending moment etc. The base moves together with the supporting structure 26 and has a complete freedom to move horizontally in all directions for maximum ground displacement in the case of an earthquake.

(2) The second part of the support system is the pedestal. FIGS. 1, 2, 3, 5. Numbers of the details are 31, 35, 37, 38, 39, 40, 47, 48. In this part of the support system, the pedestal is rigidly connected by bolts 41 to the supported structural body-42 and resists all forces relative to the supported structural body as compression, tension, bending moment etc. The pedestal moves together with the supported structural body 42 and has complete freedom to move horizontally in all directions in determined limits-50, if the structural body is affected by the exterior dynamic forces as a dynamic air pressure from bomb explosions, while the supporting structural body remains substantially stationary.

(3) The third part of the support system is the Hanger-rods. FIGS. 1, 2, 3, 4, 5, 6. (Numbers of details: 43, 44, 45, 46) In this part of the support system, the Hanger-rods join the first part of the support system—base—and supporting, structural body 26 with the second part of the support system—pedestal—and supported structural body 42 for compression and tension forces. Hanger-rods 44 are preferably of variable cross-section more convenient for compression loads. The Hanger-rods through the conventional ball bearings 43 on both ends and enlarged opening 48 have complete freedom of rotation, so that relative horizontal movement from the second part of the support system—pedestal—and structural body can move in all directions separately from the first part of the support system—base—and supporting structural body. The Hanger-rods 44 cannot move axially, therefore resist compression and tension force, respectively positive and negative vertical reactions.

(4) The fourth part of the support system is the Elastomer. FIGS. 1 and 2 (Number of details: 36). In order to make the construction perfectly safe in case the Hanger-rods 44 should give way, I prefer to provide the base plate 28 with the Elastomer. In this way the narrow gap 49 is formed between the Elastomer 36 of the base and the bottom plate 37 of the pedestal. In practice this gap should not be greater than 5 millimeters. With this construction it will be evident that if the Hanger-rods 44 fail under the tensile forces at any time, the pedestal and supported structural body would simply settle down through 5 millimeters and rest on the upper face of the Elastomer 36.

DETAILS (1) First part of the support system is the base.
Referring to FIGS. 1, 2, 3, 4 and 6.
28—welded or otherwise secured cover bottom plate. 29—welded or otherwise secured bottom plate. 30—steel or other material tube or other form body of base. 31—welded or otherwise secured stiffeners. 32—welded or otherwise secured top plate. 33—welded or otherwise secured cover plate. 34—handhole access to the ball bearing. 35—welding or otherwise secured. 47—spherical seat for the balls. 48—enlarged opening for the Hangers—44.

(2) Second part of the support system is the pedestal.
Referring to FIGS. 1, 2, 3 and 5.
31—welded or otherwise secured stiffeners. 35—welding or otherwise secured. 37—welded or otherwise secured cover plate. 38—welded or otherwise secured bottom plate. 39—steel or other material tube or the like form the body of the pedestal. 40—welded or otherwise secured top plate. 47—spherical seat for the balls. 48—enlarged opening for the Hanger-rod.

(3) Third part of the support system is the Hanger-rods.
Referring to FIGS. 1, 2, 3, 4, 5 and 6.
43—ball bearing. 44—steel or other material rod with constant or variable cross-section, the body of the Hanger-rods 45—hexagonal hold in ball for the possibility to adjust the length of the hanger-rods. 46—threads or otherwise secured.

(4) Fourth part of the support system is the Elastomer.
Referring to FIGS. 1 and 2.
36—Elastomer- any elastical body with sufficient strength to support a structural body.

FIGS. 7, 8, 9 and 10 are illustrating another embodiment of invention.

(1) The first part in this case of the support system—base is curved transverse intermediate stiffened steel plates FIGS. 7, 8 and 9. Numbers of details 31, 35, 51, 52, 53, 54, 55, 56, 62 and 63. This part of the support system—base—is rigidly connected with anchor bolts 27 to the supporting structural body 26 and resists all forces relative to the supported structural body as compression, tension, bending moment, etc. similar as in FIGS. 1, 2, 3, 4 and 6. The base moves together with the supporting structural body 26 and has a complete freedom to move horizontally in all directions 50—maximum ground displacement in the case of earthquake.

(2) The second part in this case of the support system—pedestal is curved transverse intermediate stiffened steel plate FIGS. 7, 8 and 10. Number of details: 31, 35, 57, 58, 59, 60, 61, 63 and 64. This part of support system—pedestal is rigidly connected with anchor bolts 41 to the supported structural body 42 and resists all forces relative to the supported structural body as compression, tension, bending moment etc. similar as in FIGS. 1, 2, 3 and 5. The pedestal moves together with the supported structural body 42 and has complete freedom to move horizontally parallel to supporting structural body in all directions in determined limits 50 if the structural body is affected by the exterior dynamic forces as a dynamic air pressure from bomb explosions, while the supporting structural body remains substantially stationary.

(3) The third part in this case of the support system is the Hangar-rods (FIGS. 7 and 8 Number of details: 43, 44. The action and construction of the Hanger-rods 44 is similar to the hanger-rods illustrated in FIGS. 1, 2, 3, 4, 5 and 6 Numbers of details: 43, 44, 45 and 46.

(4) The fourth part in this case of the support system is the Elastomer. FIGS. 7, 8 and 10, Number of details: 36. The action and construction of the Elastomer is similar to the Elastomer illustrated in FIGS.: 1 and 2 Number of details: 36.

DETAILS (1) First part of the support system is the base.
Referring to FIGS. 7, 8 and 9.
31—welded or otherwise secured stiffeners. 35—welding or otherwise secured. 51—welded or otherwise secured cover bottom plate. 52—welded or otherwise secured bottom plate. 53—welded or otherwise secured stiffeners. 54—welded or otherwise secured top plate. 55—welded or otherwise secured cover top plate. 56—horizontally curved, transversely stiffened plate. 62—welded or otherwise secured plate with plate 56. 63—bolts.

(2) Second part of the support system is the pedestal.
Referring to FIGS. 7, 8 and 10.
31—welded or otherwise secured stiffeners. 35—welding or otherwise secured. 57—welded or otherwise secured horizontally curved bottom plate. 58—welded or otherwise secured horizontally curved cover bottom plate. 59—welded or otherwise secured stiffeners. 60—horizontally curved stiffened steel plate. 61—welded or otherwise secured horizontally curved cover top plate. 64—welded or otherwise secured vertical plate to plate 60. 63—bolts.

(3) The third part in this case of the support system is the Hanger-rods 44 and is similar to the Hangers illustrated in FIGS. 1, 2, 3, 4, 5 and 6. Numbers of details: 43, 44, 45 and 46.

(4) The fourth part in this case of the support system is the Elastomer 36 and is similar to the Elastomer illustrated in FIGS. 1 and 2. Number of detail: 36.

FIG. 11 illustrates the support system action against the dynamic or statical air pressure to the supported structural body.

The base of the new support system, details: 28, 29, 30, 31, 32, 33, 34 and 35 is rigidly fixed to supporting structural body 26 and earth and does not move during an air pressure to the supported structural body 42.

The pedestal of the new support system, details: 31, 37, 38, 39 and 40, is rigidly fixed to the supported structural body 42 and moves together.

The Hanger-rods of the new support system, details: 43, 44 and 65 joins hangingly for compression and tension force the supported structural body and pedestal to the supporting structural body and base. 65 the length of the Hanger-rod.

In the following example FIG. 11 I take the same structural body 42 in three stages: 42-A, 42-B, 42-C.

First stage 42-A. There is no air pressure to the supported structural body 42-A. Under the gravitational load 66 from the supported structural body 42-A the Hanger-rod 44-A is in vertical position.

Second stage 42-B. There is horizontal air pressure 68-B to the structural body 42-B. The structural body starts to move horizontally and vertically by sloping the Hanger-rod 44-B. In the moment that the horizontal component 68 from the vertical gravitational load 66 equals air pressure 68-B the structural body stops to move horizontally and vertically. In the moment when there is no more air pressure 68-B the horizontal component 68 of the gravitational load returns the structural body to its first original position 42-A, similar to spring action. The FIG. 11 shows that the vertical moving distance 71 is much less than the horizontal distance 72.

Third stage 42-C is the same as the second stage 42-B only the horizontal air pressure 70-C is larger than the air pressure 68-B. The drawing illustrates that the corresponding horizontal 70 and axial 69 component increases from the same gravitational load 66 of structural body and the vertical 73 and horizontal 74 moving distances.

EXAMPLES

In order to give a better understanding of the invention support system I will present a typical examples. It is understood that the embodiments of the invention illustrated herein are only a few examples of the many embodiments this invention may take.

The new support system fulfills the following conditions:
(a) Joins hangingly by own gravitational load the supported and supporting structural bodies for the compression and tension force, but permits relative elastical horizontal movement between supported and supporting structural bodies.
(b) The supported structural body absorbs the statical and dynamical air pressure by elastically moving horizontally and less vertically.
(c) Isolates the supported structural body and its content from dynamic reversing horizontal earthquake motions. There is no BASE SHEAR between supported and supporting structural bodies.
(d) Permits only parallel movement but not swinging between supported and supporting structural bodies. The structural bodies on the top and bottom of the new support system should be horizontally rigid.
(e) Permits the thermal expansion between the supported and supporting structural bodies in all directions.
(f) Transfers the horizontal forces from one structural body to the other by sloping Hanger-rods. There is no BASE SHEAR
(g) Allows by calculation to determine the place of the point of transfer the force from supported to supporting structural body in accordance to economical and statical standpoint.

EXAMPLE 1

Nuclear Power Plant.

This example illustrates how to use the new support system to protect the nuclear power plant and all internal structural components and equipment from dynamic air pressure and dynamic reversing earthquake force.

Referring to FIGS. 12, 13, 14, 15 and 16.

Details: 44—Hangers-rods. 75—concrete foundation. 76—concrete radial beams. 77—concrete slab. 78—support system according to FIGS. 7, 8, 9 and 10. 79—nuclear reactor vessel. 80—horizontal curved steel plate. 81—stiffeners. 82—vertical curved steel plate. 83—stiffeners. 84—welding or otherwise secured. 85—water pool. 86—steam generators. 87—personal air lock. 88—concrete shield building. 89—steel containment vessel. 90—free space between steel containment vessel and concrete shield building. 91—polar crane.

Action of the new support system:

The foundation—75, the beams—76 and the slab—77 form a horizontally rigid support of the new support system—78. On the top of the new support system the bottom plate of the steel containment vessel—89 together with plates 80, and 82 and stiffeners—81 and 83 form a horizontally rigid construction. This is a guaranty that all the Hanger-rods from the new continuously support system—78 are working as one unit and the foundation and supported construction-steel containment vessel can move only horizontally and less vertically and cannot swing.

During an earthquake the steel containment vessel and its contents are almost protected from horizontal earthquake reversing dynamic earth movement. There is no BASE SHEAR between foundation and steel containment vessel.

During a heavy bomb explosion or other dynamic exterior force the steel containment vessel 89 is protected: a) from air or other dynamic pressure by concrete shield building 88 and from earth horizontal vibration by new support system 78.

The support system permits any temperature expansion for steel containment vessel 89.

The free standing steel containment vessel presents a good possibility for the cooling air or water if necessary.

One other recommendable alternative is to support separately the concrete shield building 88 and the steel containment vessel—89 by the new support system 78.

EXAMPLE 2

Industry Chimney.

This example illustrates how to use the new support system to protect the industry chimney from dynamic air pressure and horizontal earthquake dynamic force.

Figure 17:
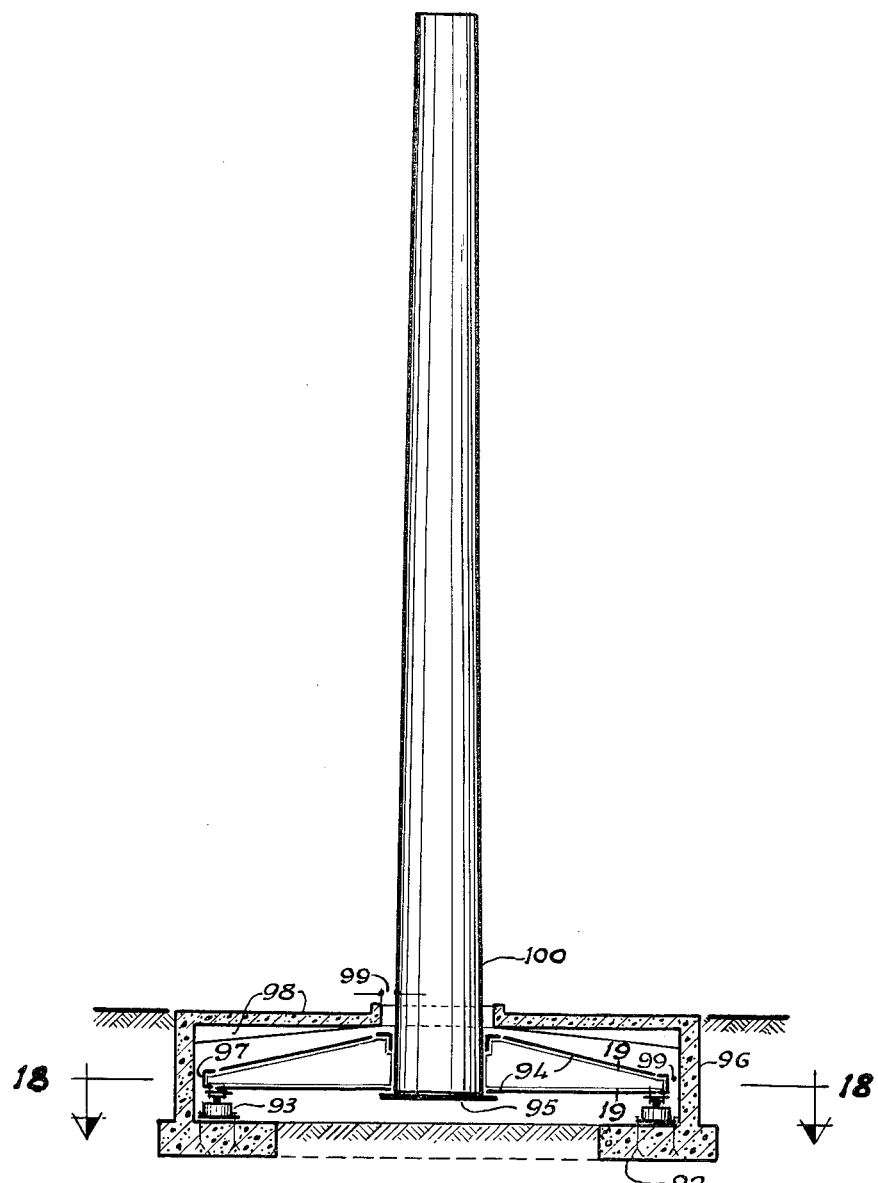
FIGS. 17, 18 and 19. EXAMPLE 2
INDUSTRY CHIMNEY
Figure 18:
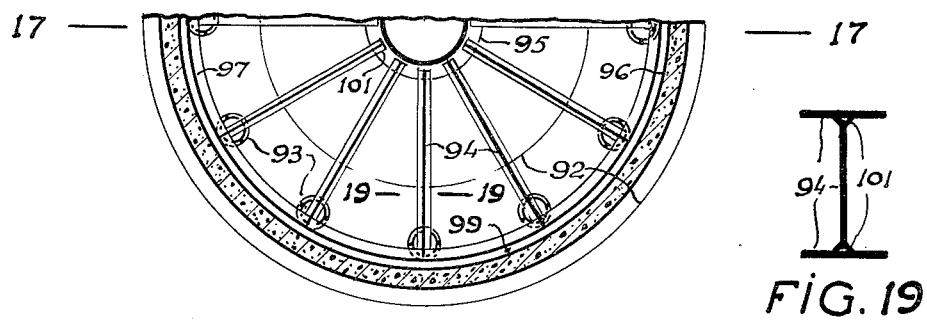
Figure 19:
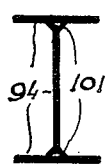

Referring to FIGS. 17, 18 and 19.

Details: 92—concrete foundation. 93—support system. 94—steel I beams. 95—stiff steel bottom plate. 96—concrete wall. 97—welded steel channel ring. 98—concrete beam and cover slab. 99—space, earthquake displacement. 100—industry chimney. 101—welding.

Action of the new support system.

The foundation—92, the walls—96 and the beams and slab—98 form a horizontally rigid support of the new support system—93. On the top of the new support system the channel ring—97, the beam—94 and the bottom plate—95 form a horizontally rigid construction.

In the case of a near heavy bomb explosion or other dynamic air pressure the industry chimney moves elastically horizontally and slopes the Hanger-rods of the support system. The slope Hanger-rod action is similar to the elastical action of the springs. There is tension force in the support system on the side of explosion respectively the compression force in Hanger-rods. On the opposite side there is compression force in the support system respectively tension force in Hanger-rods.

During an earthquake the industry chimney of inertia remains almost isolated from the rapidly reversing horizontal earth movement. There is no BASE SHEAR.

EXAMPLE 3

Building.

This example illustrates how to use the new support system to protect the building from dynamic air pressure and horizontal reversing dynamic earthquake force.

Figure 21:
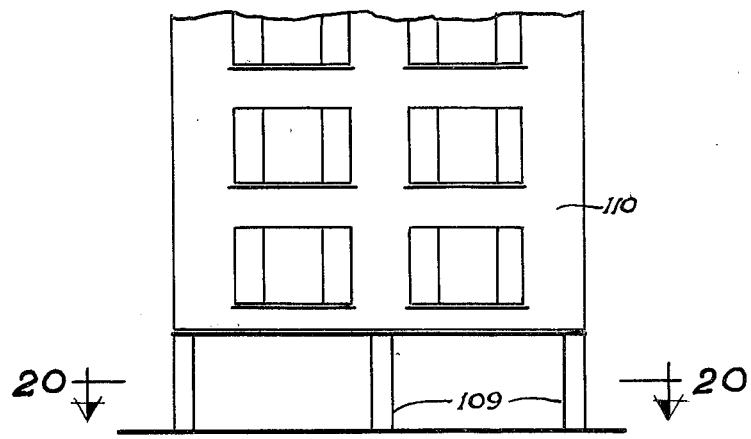
FIGS. 20, 21 and 22. EXAMPLE 3
BUILDING
Figure 20:
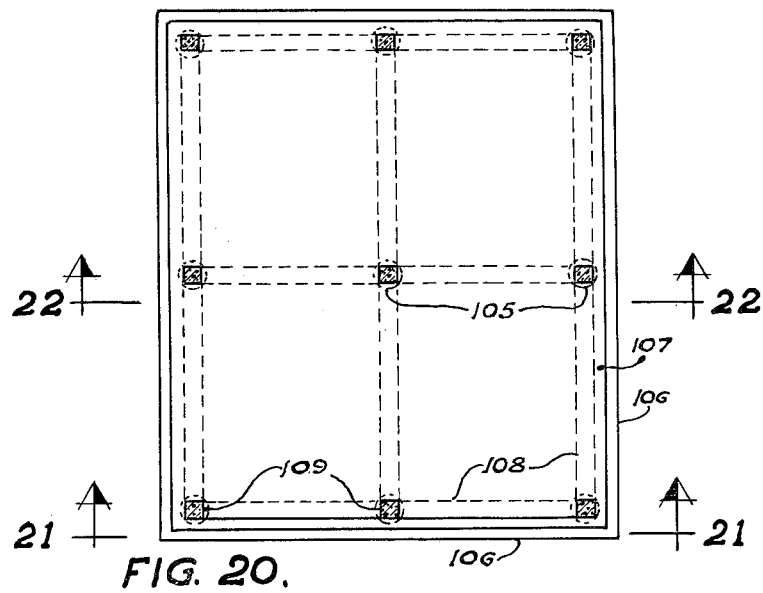
Figure 22:
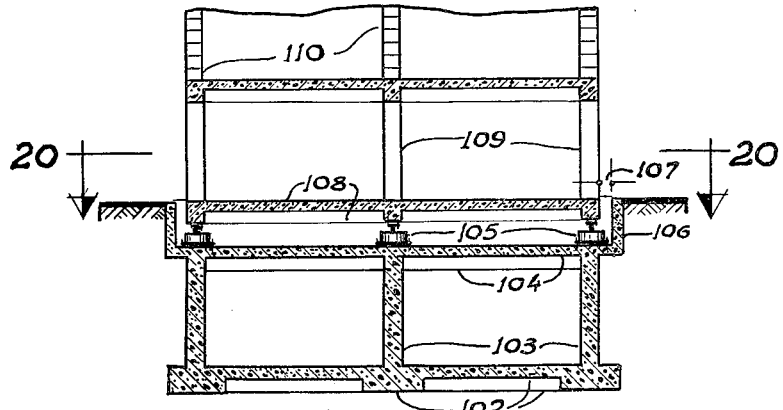

Referring to FIGS. 20, 21 and 22.

Details: 102—foundation. 103—concrete basement walls. 104—concrete basement ceiling beams and slab. 105—new support system. 106—concrete retaining wall. 107—space, earthquake displacement. 108—concrete beams and slabs. 109—concrete columns. 110—building.

Action of the new support system.

The basement ceiling, concrete beams and slab—104 form a horizontally rigid support of the new support system. On the top of the new support system the concrete beams and slab—108 form a horizontally rigid construction.

In the case of a near heavy bomb explosion or other dynamic air pressure the building moves horizontally, parallel to basement ceiling and slope the Hanger-rods of the support system. The slope Hanger-rod action is similar to the elastical action of springs.

During an earthquake the building of inertia remains almost isolated from the rapidly reversing horizontal earth movement. There is no BASE SHEAR.

EXAMPLE 4

Bridge.

This example illustrates how to use the new support system to protect the bridge from dynamic air pressure and earthquake force to the possibility to select the best place to transfer the load of superstructure to the foundation in accordance to economical and statical standpoint.

Figure 23:
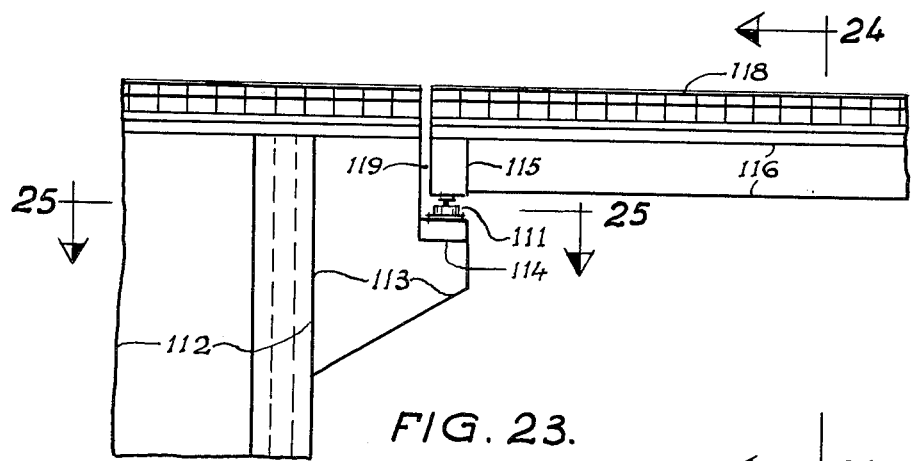
FIGS. 23, 24 and 25. EXAMPLE 4
BRIDGE
Figure 24:
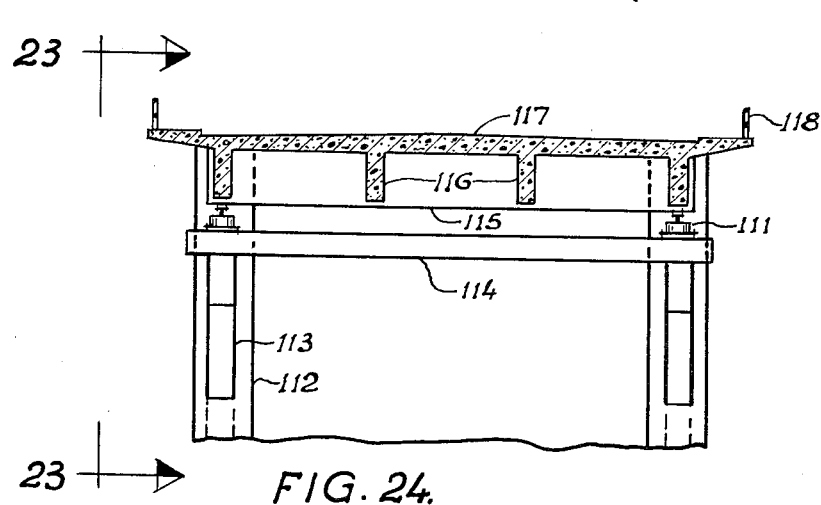
Figure 25:
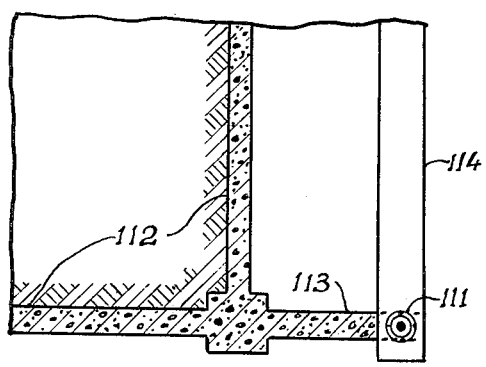

Referring to FIGS. 23, 24 and 25.

Details: 111—support system. 112—concrete abutment. 113—concrete cantilever beams. 114—concrete crossbeam on the cantilever beams. 115—concrete crossbeam carrying the concrete longitudinal beams 116. 117—concrete slab. 118—superstructure of the bridge.

(a) The new support system transfers the loads of the superstructure to the cantilever beams—113 of the abutment—112 and minimizes the length of the longitudinal beams—116 and the cost of the bridge. The two cantilever beams—113 are direct continuation of the wing walls of the abutment—112, statically favorable solution.

(b) The crossbeam—114 with cantilever beams—113 on bottom and the crossbeam—115 with longitudinal beams—116 on the top of the support system—111 forms a horizontally rigid construction.

(c) The new support system—111 joins hangingly the superstructure with the cantilever beams—113 and abutment 112 for the compression and tension forces, but permits essentially independent relative horizontal motion between the superstructure and cantilever beams—abutment in all directions.

(d) In the case of a near heavy bomb explosion or other dynamic air pressure the superstructure of the bridge moves elastically horizontally and vertically by slopes the Hanger-rods of the support system. The slope Hanger-rods action is almost similar to the elastical action of the springs. The superstructure has no uplift possibility of the cantilever beams—abutment.

(e) During an earthquake the superstructure of inertia remains almost isolated from the rapidly reversing horizontal earth movement and abutment with cantilever beams. There is no BASE SHEAR.

(f) The new support system permits the thermal expansion of the superstructure in all directions.

I claim.

1. A support system for protecting a supported structural body from dynamic forces as reversing horizontal earthquake motion, exterior explosions, cyclons, said system including a supporting foundation having an upper surface and at least three hanger devices secured between the lower surface of the supported structural body and the upper surface of the supporting structural body, each hanger device comprising:

a. A base including a bottom plate on a relatively short tubular element, said bottom plate being secured to the upper surface of the supporting foundation, and a top plate having a central opening, a plurality of enlarged openings and a spherical seat adjacent to each enlarged opening, b. A plurality of hanger-rods, one for each enlarged opening, each hanger-rod having a rod portion and an upper and lower ball bearing, each upper ball bearing being free to rotate in a spherical seat and the attached rod portion extending downward through the adjacent enlarged opening; and c. A relatively short pedestal element, said element including an upper plate secured to the lower surface of the supported structural body, a tubular support portion extending downward from the plate through the central opening of the top plate and lower plate secured to the lower most portion of the tubular support portion, said lower plate having a plurality of enlarged openings and a spherical seat adjacent to each enlarged opening, the lower end of each hanger-rod extending downward through an enlarged opening and the lower ball of each hanger rod being free to rotate, within the corresponding spherical seat, whereby when earthquake motion occurs the plurality of the base and the attached supporting structural body can move freely in any direction relative to the earth, and shock waves from the earth are not transmitted to the supported structure, and in the case of dynamic air pressure the structural body moves elastically horizontally by sloping hanger-rods, and the action of sloped hanger-rods is similar to the elastic action of the springs, increasing a slope of the hanger-rods increases the horizontal counterforce to the air pressure.

2. The support system of claim 1 wherein an elastomeric pad is provided in the base and positioned beneath the pedestal element to engage the lower plate of the pedestal if the hanger elements should give way.

* * * * *